US010994735B2

(12) United States Patent
Matsunaga et al.

(10) Patent No.: US 10,994,735 B2
(45) Date of Patent: May 4, 2021

(54) VEHICLE CONTROL DEVICE

(71) Applicant: HONDA MOTOR CO., LTD., Tokyo (JP)

(72) Inventors: Hideki Matsunaga, Wako (JP); Masaaki Nagashima, Wako (JP); Toshiaki Takano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 16/151,823

(22) Filed: Oct. 4, 2018

(65) Prior Publication Data

US 2019/0106111 A1 Apr. 11, 2019

(30) Foreign Application Priority Data

Oct. 6, 2017 (JP) .............................. JP2017-195603

(51) Int. Cl.
*B60W 30/18* (2012.01)
(52) U.S. Cl.
CPC ............... *B60W 30/18154* (2013.01); *B60W 30/18145* (2013.01); *B60W 30/18163* (2013.01); *B60W 2420/42* (2013.01); *B60W 2420/52* (2013.01); *B60W 2554/00* (2020.02); *B60W 2556/50* (2020.02); *B60W 2720/24* (2013.01)

(58) Field of Classification Search
CPC ..... B60W 30/18154; B60W 30/18145; B60W 30/18163; B60W 2556/50; B60W 2554/00; B60W 2420/42; B60W 2420/52; B60W 2720/24
See application file for complete search history.

(56) References Cited

U.S. PATENT DOCUMENTS

| 5,703,778 | A | * | 12/1997 | Takahashi | G08G 1/08 340/910 |
| 6,129,025 | A | * | 10/2000 | Minakami | B60L 50/51 104/88.01 |
| 6,269,304 | B1 | * | 7/2001 | Kaji | G01C 21/3658 342/70 |
| 2005/0256630 | A1 | * | 11/2005 | Nishira | G08G 1/167 701/96 |
| 2006/0155427 | A1 | * | 7/2006 | Yang | G08G 1/081 701/1 |

(Continued)

FOREIGN PATENT DOCUMENTS

| JP | 2011-145756 A | 7/2011 |
| JP | 2015-147525 A | 8/2015 |
| WO | 2016/063383 A1 | 4/2016 |

OTHER PUBLICATIONS

Office Action dated Apr. 16, 2019 issued over the corresponding Japanese Patent Application No. 2017-195603 with the English translation thereof.

*Primary Examiner* — Behrang Badii
*Assistant Examiner* — Daniel L Greene
(74) *Attorney, Agent, or Firm* — Carrier Blackman & Associates, P.C.; Joseph P. Carrier; Jeffrey T. Gedeon

(57) ABSTRACT

In a case where a host vehicle that is traveling on a first lane intends to turn right or left at an intersection via a second lane whose traveling direction coincides with that of the first lane, a vehicle controller constituting a part of a vehicle control device performs a travel control or an assistance control that differs depending on whether the second lane is a priority lane where another vehicle that is different in type from the host vehicle preferentially travels.

3 Claims, 6 Drawing Sheets

(56) References Cited

U.S. PATENT DOCUMENTS

| | | | |
|---|---|---|---|
| 2009/0320713 A1* | 12/2009 | Amiri | B62D 55/06 |
| | | | 104/281 |
| 2011/0184641 A1* | 7/2011 | Arie | G01C 21/3658 |
| | | | 701/533 |
| 2011/0276258 A1* | 11/2011 | Miyakoshi | G08G 1/164 |
| | | | 701/117 |
| 2013/0035858 A1* | 2/2013 | Sumizawa | G01C 21/3658 |
| | | | 701/533 |
| 2016/0170487 A1* | 6/2016 | Saisho | B60K 35/00 |
| | | | 345/156 |
| 2017/0320521 A1* | 11/2017 | Fujita | B62D 6/00 |
| 2018/0239358 A1* | 8/2018 | Choi | G05D 1/0246 |
| 2019/0016345 A1* | 1/2019 | Kitagawa | G08G 1/163 |
| 2019/0108752 A1* | 4/2019 | Oe | G08G 1/0141 |

* cited by examiner

VEHICLE CONTROL DEVICE

CROSS-REFERENCE TO RELATED APPLICATION

This application is based upon and claims the benefit of priority from Japanese Patent Application No. 2017-195603 filed on Oct. 6, 2017, the contents of which are incorporated herein by reference.

BACKGROUND OF THE INVENTION

Field of the Invention

The present invention relates to a vehicle control device that performs a travel control for a host vehicle at least partially automatically.

Description of the Related Art

Techniques of performing a travel control of a driver's own vehicle (which will be also referred to as a host vehicle) at least partially automatically (automated driving technique or driving assistance technique) have conventionally been developed. For example, various driving assistance techniques have been proposed to enable the host vehicle to travel smoothly around intersections in consideration of the relation with other vehicles.

Japanese Laid-Open Patent Publication No. 2015-147525 proposes a vehicle control device that, in a case where a distance to an intersection is less than or equal to a threshold, sets a target distance in an inter-vehicle distance control to a value larger than a predetermined value (a distance from an entrance position to an exit position of the intersection). According to this literature, the host vehicle cannot enter the intersection at least before the preceding vehicle passes through the intersection, and therefore the traffic flow is not interrupted.

SUMMARY OF THE INVENTION

When the host vehicle traveling on a road with a plurality of lanes (a multi-lane road) turns right or left at an intersection, the host vehicle may want to move in advance to the lane on a side toward which the vehicle wants to turn (that is, lane change). For example, when a particular type of vehicle in a priority lane (for example, a bus) travels or stops near the host vehicle, the following driving scene may be expected: the host vehicle decelerates or stops near the intersection in consideration of how the particular type of vehicle travels. As a result, it takes time for the host vehicle to pass the intersection, resulting in decrease in convenience for driving.

In this point, it cannot be said that the technique proposed in Japanese Laid-Open Patent Publication No. 2015-147525 considers the driving scene in which the vehicle turns right or left at an intersection on a multi-lane road. That is to say, the host vehicle trying to enter the intersection without intention of interrupting the traffic flow may unexpectedly result in interrupting the traffic flow because of the existence of a particular type of vehicle on another lane, and then an unnecessary traffic jam may occur.

The present invention has been made in order to solve the above problem, and an object of the present invention is to provide a vehicle control device that can make it more convenient to drive in a predetermined driving scene where the vehicle turns right or left at an intersection.

A vehicle control device according to the present invention is a device configured to perform a travel control for a host vehicle at least partially automatically, and including: an intersection recognition unit configured to recognize an intersection on a scheduled travel route of the host vehicle; and a vehicle controller configured to perform the travel control or an assistance control regarding a lane change when the host vehicle turns right or left at the intersection recognized by the intersection recognition unit, wherein in a case where the host vehicle that is traveling on a first lane intends to turn right or left via a second lane whose traveling direction coincides with that of the first lane, the vehicle controller is configured to perform the travel control or the assistance control that differs depending on whether the second lane is a priority lane where a particular type of vehicle that is different in type from the host vehicle preferentially travels.

In this manner, the travel control or the assistance control that differs depending on whether the second lane where the host vehicle passes when turning right or left is the priority lane where a particular type of vehicle that is different in type from the host vehicle preferentially travels is performed. Therefore, it is possible to perform the lane change suitable for the driving scene in relation to the particular type of vehicle that can exist around the intersection. Thus, driving in a predetermined driving scene of turning right or left at the intersection becomes more convenient.

In addition, in a case where the second lane is the priority lane and the particular type of vehicle exists ahead of the host vehicle, the vehicle controller may start the travel control or the assistance control earlier than in a case where the second lane is not the priority lane. Thus, in consideration of the possibility that the particular type of vehicle ahead of the host vehicle might interrupt the lane change of the host vehicle, the lane change can be performed smoothly and quickly.

Moreover, in a case where the second lane is the priority lane and the particular type of vehicle does not exist ahead of the host vehicle, the vehicle controller may start the travel control or the assistance control later than in a case where the second lane is not the priority lane. Thus, an extra time is secured in order to allow the particular type of vehicle that might approach the host vehicle from behind to preferentially travel, and therefore the possibility that the host vehicle might interrupt travel of the particular type of vehicle can be reduced.

Furthermore, the first lane may be a lane where turning right or left at the intersection is not permitted; and the second lane may be a lane where turning right or left at the intersection is permitted. From the viewpoint of the traffic rules, the host vehicle must pass through the second lane, and therefore, performing the travel control or the assistance control that differs depending on the second lane is particularly effective for driving.

By the vehicle control device according to the present invention, it is possible to enhance the convenience of driving in a predetermined driving scene where the host vehicle is going to turn right or left at an intersection.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a vehicle control device according to the present invention is hereinafter described with reference to the attached drawings.

[Structure of Vehicle Control Device 10]

Figure 1:
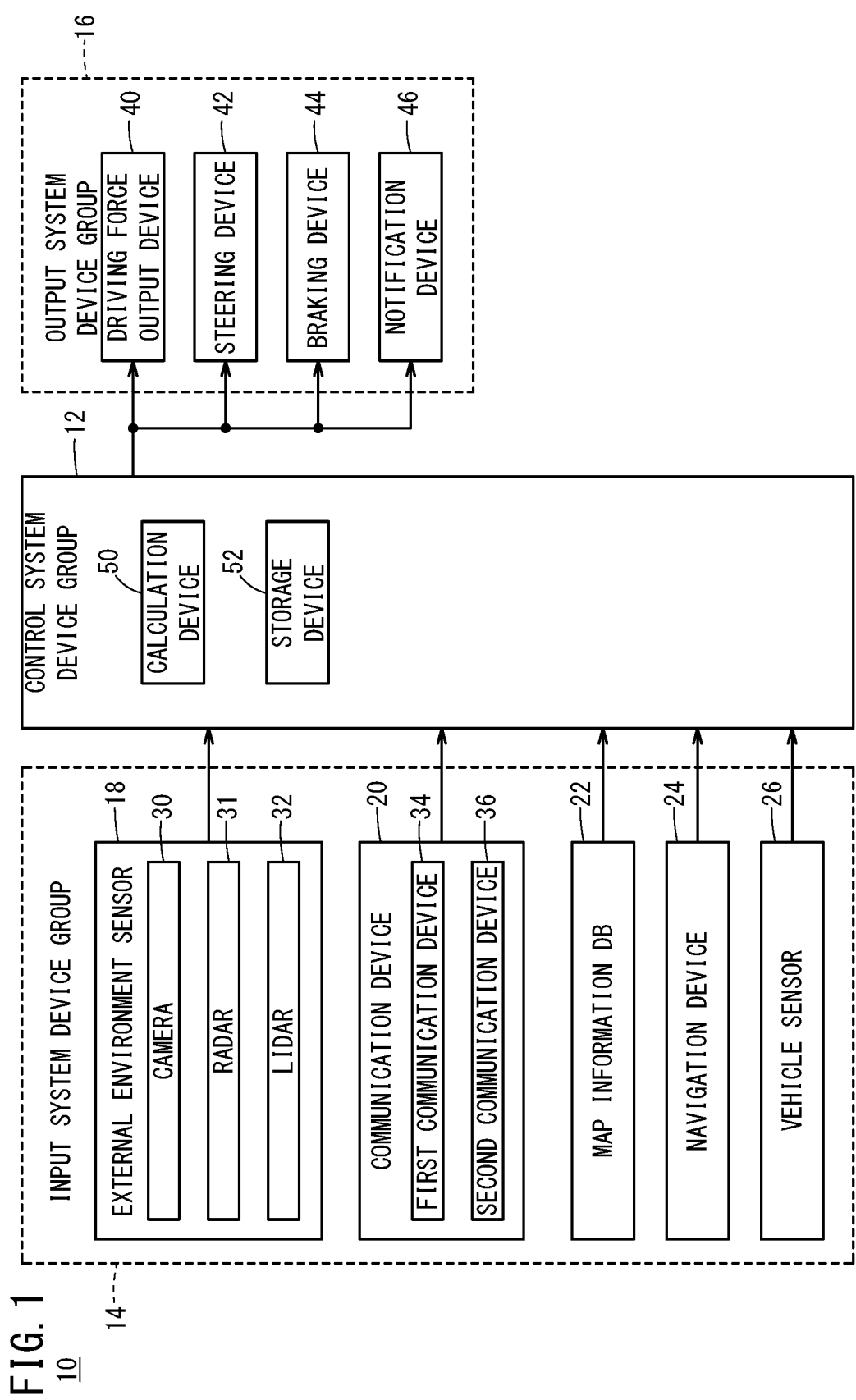
FIG. 1 is a block diagram illustrating a structure of a vehicle control device according to one embodiment of the present invention.

FIG. 1 is a block diagram illustrating a structure of a vehicle control device 10 according to one embodiment of the present invention. The vehicle control device 10 is incorporated in a vehicle (the driver's own vehicle 100 in FIG. 4, etc., which will be also referred to as a host vehicle) and controls driving of the vehicle either automatically or manually. "Automated driving" implies a concept that includes not only "fully automated driving" in which the travel control of the vehicle is performed entirely automatically, but also "partial automated driving" in which the travel control is performed partially automatically.

The vehicle control device 10 includes a control system device group 12 that collectively controls the driving of the vehicle, a device group (hereinafter referred to as an input system device group 14) that performs an input function of the control system device group 12, and a device group (hereinafter referred to as an output system device group 16) that performs an output function of the control system device group 12.

<Specific Structure of Input System Device Group 14>

The input system device group 14 includes: an external environment sensor 18 that detects a state of a periphery (external environment) of the vehicle; a communication device 20 that transmits and receives information to and from various communication devices outside the vehicle; a high-precision map database (hereinafter, map information DB 22) that acquires map information indicating a high-precision map; a navigation device 24 that generates a travel route to a destination and measures a travel position of the vehicle; and a vehicle sensor 26 that detects a state of the vehicle.

The external environment sensor 18 includes one or more cameras 30 that capture images of the external environment, one or more radars 31 that detect the distance and the relative speed between the vehicle and another object, and one or more LIDARs 32 (Light Detection and Ranging/Laser Imaging Detection and Ranging).

The communication device 20 includes a first communication device 34 that performs vehicle-to-vehicle communication with another vehicle, and a second communication device 36 that performs road-to-vehicle communication with a road-side device. The navigation device 24 includes a satellite navigation system and a self-contained navigation system. The vehicle sensor 26 includes various sensors that detect a behavior of the vehicle, such as a vehicle speed sensor, an acceleration sensor, a yaw rate sensor, and an inclination sensor, various sensors that detect an operation state of the vehicle, and various sensors that detect a state of a driver.

<Specific Structure of Output System Device Group 16>

The output system device group 16 includes a driving force output device 40, a steering device 42, a braking device 44, and a notification device 46.

The driving force output device 40 includes a driving force output electronic control unit (ECU), and a driving source such as an engine or a driving motor. The driving force output device 40 generates a driving force in response to a driver's operation of an accelerator pedal or a driving control command that is output from the control system device group 12.

The steering device 42 includes an electric power steering system (EPS)-ECU, and an EPS actuator. The steering device 42 generates a steering force in response to a driver's operation of a steering wheel or a steering control command that is output from the control system device group 12.

The braking device 44 includes a braking ECU and a braking actuator. The braking device 44 generates a braking force in response to a driver's operation of a braking pedal or a braking control command that is output from the control system device group 12.

The notification device 46 includes a notification ECU and an information transmission device (such as a display device, an acoustic device, or a tactile device). The notification device 46 notifies a driver in response to a notification instruction that is output from the control system device group 12 or another ECU (for example, provides information through any of five senses including visual and auditory senses).

<Specific Structure of Control System Device Group 12>

The control system device group 12 includes one or more ECUs, and includes a calculation device 50 such as a processor and a storage device 52 such as a ROM or a RAM. The control system device group 12 achieves various functions by the calculation device 50 executing programs stored in the storage device 52.

Figure 2:
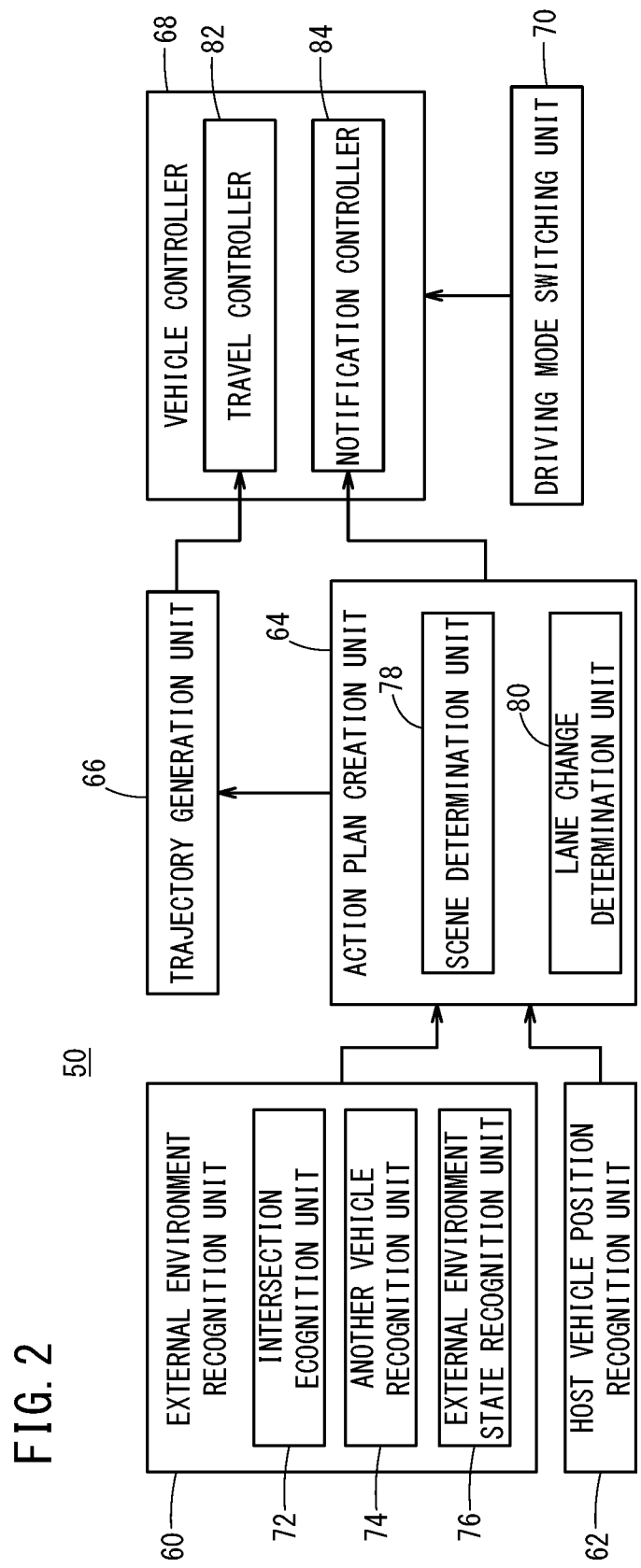
FIG. 2 is a function block diagram of a calculation device illustrated in FIG. 1.

FIG. 2 is a function block diagram of the calculation device 50 illustrated in FIG. 1. This calculation device 50 is configured to perform various functions of an external environment recognition unit 60, a host vehicle position recognition unit 62, an action plan creation unit 64, a trajectory generation unit 66, a vehicle controller 68, and a driving mode switching unit 70.

The external environment recognition unit 60 recognizes a situation and an object around the vehicle on the basis of the information output from the external environment sensor 18. This external environment recognition unit 60 includes an intersection recognition unit 72, an another vehicle recognition unit 74, and an external environment state recognition unit 76.

The host vehicle position recognition unit 62 recognizes an absolute position of the vehicle or a relative position of the vehicle on the high-precision map (hereinafter also referred to as host vehicle position) on the basis of information output from the navigation device 24 and the map information DB 22.

The action plan creation unit 64 creates an action plan (a time series of events for each travel segment) in accordance with the situation of the vehicle on the basis of recognition results of the external environment recognition unit 60 and the host vehicle position recognition unit 62, and updates the content of the action plan as necessary.

The action plan creation unit 64 includes a scene determination unit 78, and a lane change determination unit 80.

The trajectory generation unit 66 generates a travel trajectory (a time series of target behaviors) in accordance with the action plane created by the action plan creation unit 64 on the basis of the recognition results of the external environment recognition unit 60 and the host vehicle position recognition unit 62.

The vehicle controller 68 instructs the output system device group 16 (FIG. 1) to operate, on the basis of a creation result of the action plan creation unit 64 or a generation result of the trajectory generation unit 66. The vehicle controller 68 includes a travel controller 82 that performs a travel control of the vehicle, and a notification controller 84 that performs a notification control for the driver.

The driving mode switching unit 70 is configured to switch between a plurality of driving modes including "automated driving mode" and "manual driving mode" in response to a driver's predetermined action (for example, operation of input device including a switch and a steering wheel). A request action that the driver performs in order to shift from the automated driving to the manual driving is hereinafter referred to as "take over request" (TOR).

[Operation of Vehicle Control Device 10]

The vehicle control device 10 according to the present embodiment is structured as above. Subsequently, an operation of the vehicle control device 10 when the vehicle turns right or left at an intersection 108 (FIG. 4) and an intersection 128 (FIG. 5, FIG. 6) is described mainly with reference to a flowchart of FIG. 3. In this example, the host vehicle 100 incorporating the vehicle control device 10 travels by means of automated driving.

Figure 4:
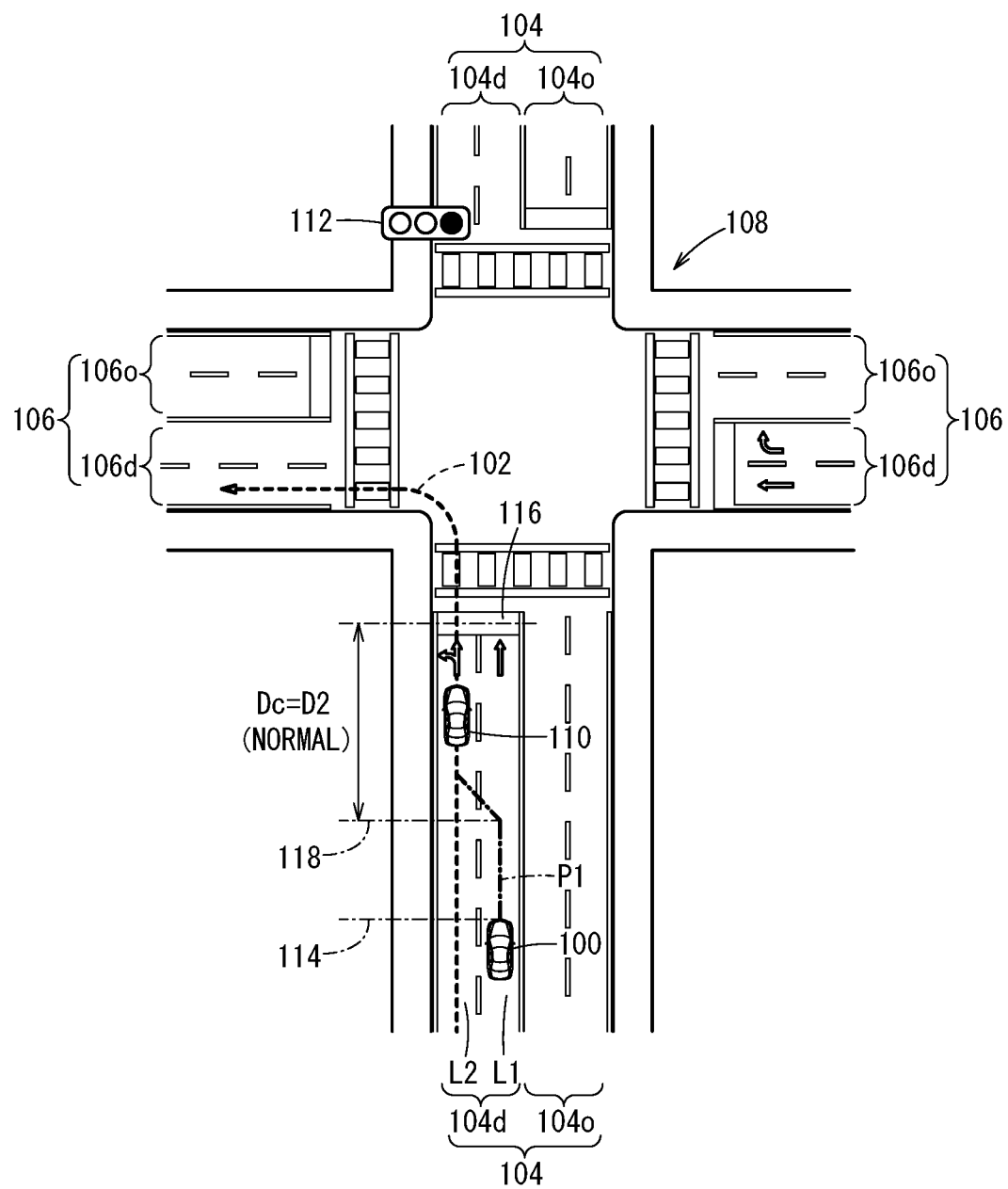
FIG. 4 illustrates a first driving scene around an intersection.

FIG. 4 illustrates a first driving scene around the intersection 108. The host vehicle 100 intends to pass a point where a road 104 and a road 106 intersect (that is, the intersection 108) along a scheduled travel route 102 that is shown by a dashed arrow. Here, the scheduled travel route 102 means a route where the host vehicle 100 is scheduled to travel.

The road 104 includes four lanes: travel lanes 104d (two lanes) where the host vehicle 100 is scheduled to travel, and opposite lanes or oncoming lanes 104o (two lanes) that are opposite to the travel lanes 104d. The road 106 includes four lanes: travel lanes 106d (two lanes) where the host vehicle 100 is scheduled to travel, and opposite lanes or oncoming lanes 106o (two lanes) that are opposite to the travel lanes 106d.

In order to distinguish the two lanes of the travel lanes 104d, the right lane where the host vehicle 100 (general vehicle) exists may be referred to as "first lane L1", and the left lane where another vehicle 110 (general vehicle) exists may be referred to as "second lane L2". The first lane L1 is a lane where the vehicle is permitted to travel straight only, and the second lane L2 is a lane where the vehicle is permitted to travel straight and turn left.

In this drawing, vehicles drive in a country or a region where drivers should keep to "the left side" of the road. In this case, when turning left at the intersection 108, the host vehicle 100 needs to sequentially move from the first lane L1 via the second lane L2 to the travel lane 106d intersecting with the travel lane 104d. On the contrary, in a country or a region where drivers should keep to "the right side" of the road, this case corresponds to "a case where the vehicle turns right at the intersection".

Near a corner of the intersection 108, a traffic light 112 is installed and indicates whether vehicles are permitted to go. For the convenience of description, only the traffic light 112 for the travel lanes 104d is shown; however, in fact, traffic lights for the opposite lanes 104o, the travel lanes 106d, and the opposite lanes 106o are also installed.

Figure 3:
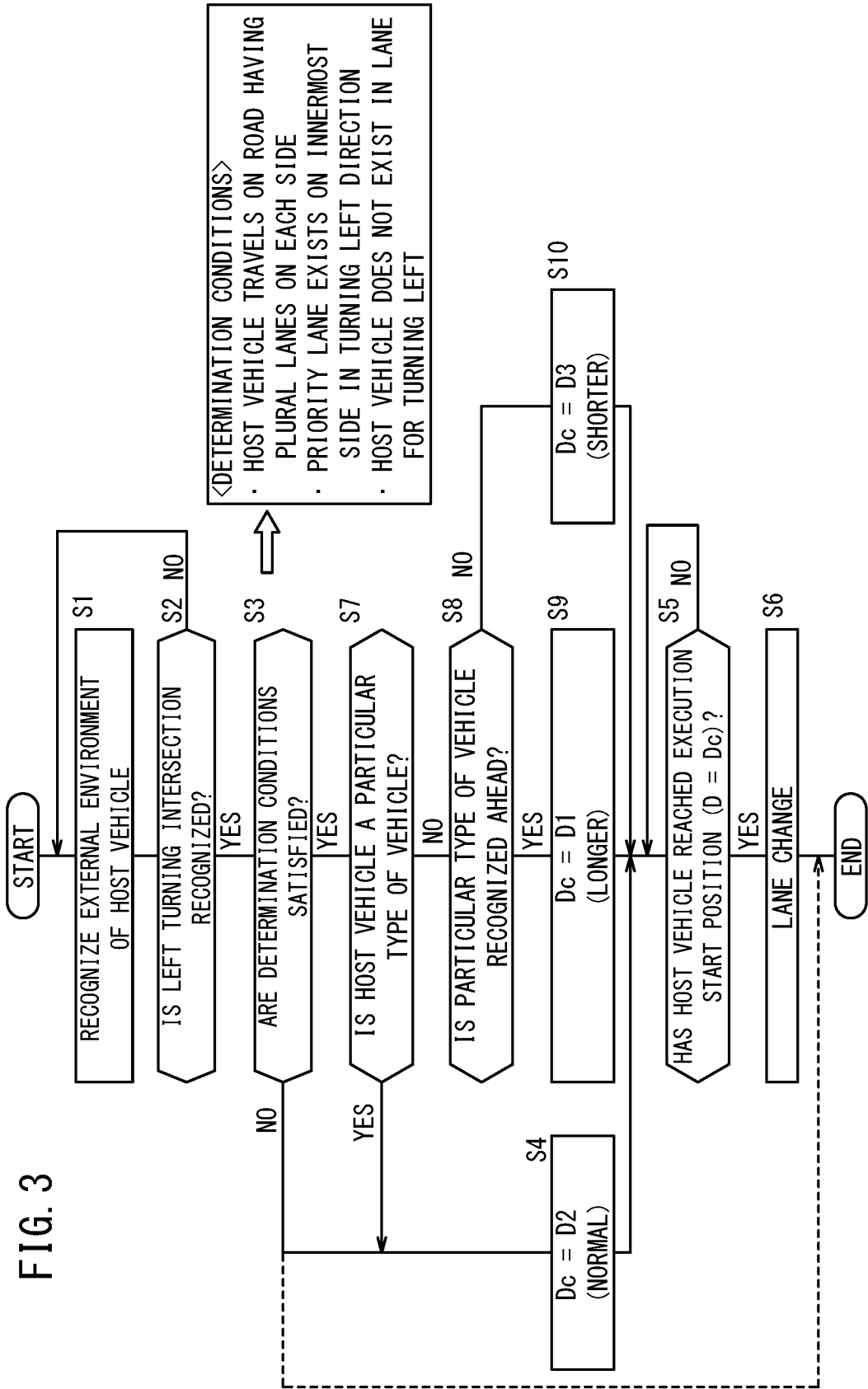
FIG. 3 is a flowchart for describing an operation of the calculation device illustrated in FIG. 2.

In step S1 in FIG. 3, the external environment recognition unit 60 recognizes the situation and the object around the host vehicle 100 on the basis of the information output from the external environment sensor 18.

For example, the intersection recognition unit 72 recognizes the presence or absence, the type, and the size of the intersection 108, and the position of a stop line 116 on the scheduled travel route 102 of the host vehicle 100, based on image information of the camera 30 and map information (high-precision map) read out from the map information DB 22.

For example, the another vehicle recognition unit 74 recognizes the presence or absence, the position, the size, and the type of another vehicle 110 that travels or stops around the host vehicle 100, and calculates the distance and the relative speed between the host vehicle 100 and the other vehicle 110 on the basis of information output from the camera 30, the radar 31, or the LIDAR 32.

For example, the external environment state recognition unit 76 recognizes an overall road environment, such as the shape and the width of the road, the positions of lane marks, the number of lanes, the lane width, the signaling state of the traffic light 112, the open/close state of a crossing gate, and the like, on the basis of image information of the camera 30 or map information (high-precision map) read out from the map information DB 22.

In step S2, it is determined whether the intersection recognition unit 72 has recognized "left turn intersection" where the host vehicle 100 is scheduled to turn left and pass. Specifically, the intersection recognition unit 72 recognizes whether the left turn intersection exists or not, for example, by referring to the map information from the map information DB 22 and the latest action plan (event of "turn right or left") created by the action plan creation unit 64.

In a case where the intersection 108 in FIG. 4 is not recognized (step S2: NO), the process returns to step S1, and the processes in steps S1 and S2 are repeated sequentially. On the other hand, in a case where the intersection 108 is recognized first at a time point when the host vehicle 100 reaches a recognition position 114 (step S2: YES), the process proceeds to step S3.

In step S3, the scene determination unit 78 determines whether determination conditions regarding the driving scene around the intersection 108 recognized in step S1 are satisfied. Specifically, the determination conditions are that: [Condition 1] the host vehicle 100 is traveling on a road having a plurality of lanes on each side; [Condition 2] the road has a priority lane on the innermost side in the turning left direction; and [Condition 3] the host vehicle 100 is not in a lane for turning left (i.e., a lane where turning left is permitted).

In the example of FIG. 4, the host vehicle 100 is traveling on the road 104 (two lanes on each side) and thus [Condition 1] is satisfied, and the host vehicle 100 is in the first lane L1 (straight travel lane) and thus [Condition 3] is satisfied. However, since the second lane L2 is an ordinary lane, [Condition 2] is not satisfied.

That is to say, the determination conditions are not satisfied in the driving scene in FIG. 4 (step S3: NO), and therefore, when the host vehicle 100 turns left at the intersection 108, the lane change determination unit 80 determines whether the host vehicle 100 needs to change the lane. If the host vehicle 100 can turn left at the intersection 108 without changing the lane, the flowchart in FIG. 3 is put to an end (shown with a dashed line). On the other hand, if the host vehicle 100 needs to change the lane when turning left at the intersection 108, the process proceeds to step S4 (shown with a solid line).

In step S4, the lane change determination unit 80 sets a timing to start a travel control or an assistance control regarding the lane change (hereinafter also referred to as "lane change control" collectively), to a "normal" timing. More specifically, the lane change determination unit 80 sets a lane change distance Dc to D2 (Dc=D2). This lane change distance Dc corresponds to the distance from the stop line 116 of the travel lane 104d to an execution start position 118.

In step S5, the lane change determination unit 80 determines whether the host vehicle 100 has reached the execution start position 118 (distance D=Dc) set in step S4. If the host vehicle has not reached yet (step S5: NO), the process remains in step S5 until the host vehicle 100 reaches the execution start position 118. On the other hand, if the host vehicle 100 has reached the execution start position 118 (step S5: YES), the process advances to the next step S6.

In step S6, the vehicle controller 68 performs the lane change control starting from the execution start position 118. Prior to this control, the vehicle controller 68 acquires the event content of the action plan created by the action plan creation unit 64 and the travel trajectory generated by the trajectory generation unit 66.

After that, the travel controller 82 generates control signals to achieve the travel trajectory indicating the lane change, and outputs the control signals to the driving force output device 40, the steering device 42, and the braking device 44. On the other hand, the notification controller 84 generates a notification signal indicating the notification content that assists the lane change (for example, instruction as to when to change the lane), and outputs this notification signal to the notification device 46.

As illustrated in FIG. 4, the host vehicle 100 starts to change the lane at the execution start position 118, and moves from the first lane L1 to the second lane L2 along an actual route P1 shown with a dash-dot line. Thereafter, the host vehicle 100 turns left from a position across the stop line 116 and then passes through the intersection 108.

In this manner, in the first driving scene illustrated in FIG. 4, the vehicle control device 10 starts the lane change control at the execution start position 118 where the distance D from the stop line 116 is D2 (D=D2). Next, description is given of an operation of the vehicle control device 10 in another situation (second driving scene) that is different from the situation in FIG. 4.

Figure 5:
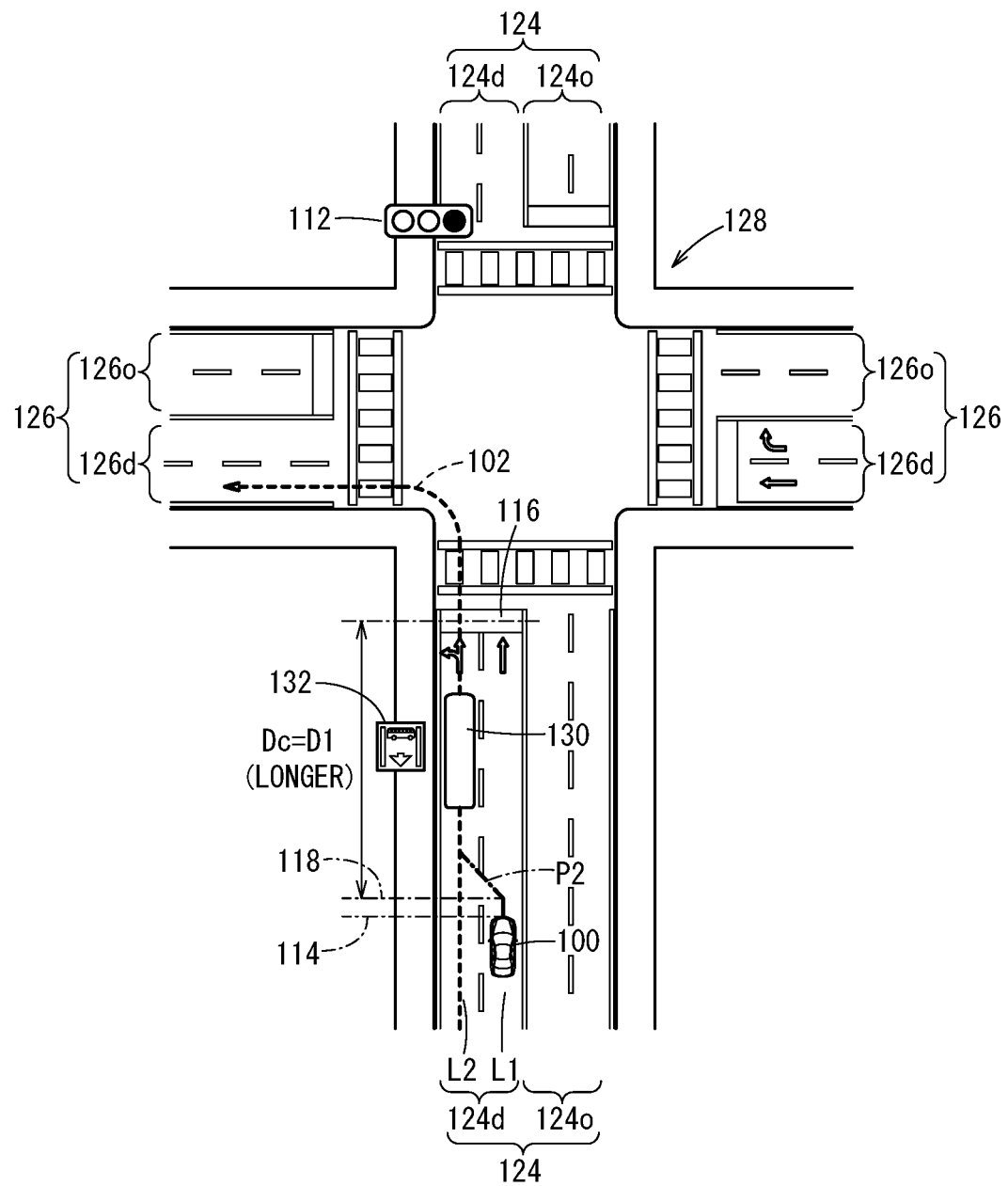
FIG. 5 illustrates a second driving scene around an intersection.

FIG. 5 illustrates the second driving scene around the intersection 128. The host vehicle 100 intends to pass a point where a road 124 and a road 126 intersect (that is, an intersection 128) along a scheduled travel route 102 shown by a dashed arrow.

The road 124 includes travel lanes 124d and opposite lanes 124o in a manner similar to the road 104 (FIG. 4). The road 126 includes travel lanes 126d and opposite lanes 126o in a manner similar to the road 106 (FIG. 4).

In the example of this drawing, the host vehicle 100 is a general vehicle that travels on the first lane L1 of the travel lanes 124d. Another vehicle 130 is a bus that travels on the second lane L2 of the travel lanes 124d ahead of the host vehicle 100.

The intersection 128 has the same road shape as that of the intersection 108 except that the type of the second lane L2 is different. Here, the second lane L2 of the road 124 is a bus priority lane where "the bus", which is different in type from "the general vehicle", preferentially travels, as shown by a sign 132 installed on the road side.

In the example of FIG. 5, the host vehicle 100 is traveling on the road 124 (two lanes on each side) and thus [Condition 1] is satisfied, and the host vehicle 100 is in the first lane L1 (straight travel lane) and thus [Condition 3] is satisfied. In addition, the second lane L2 is the bus priority lane and thus [Condition 2] is satisfied. In this case, after the scene determination unit 78 determines that the determination conditions are satisfied (step S3: YES), the process proceeds to step S7.

In step S7, the scene determination unit 78 determines whether the host vehicle 100 is a particular type (a specific type) of vehicle that can preferentially travels on the second lane L2. If the vehicle 100 is "the bus", the host vehicle 100 is determined to be the particular type of vehicle (step S7: YES), and the process proceeds to step S4 described above. On the other hand, in the example of FIG. 5, the host vehicle 100 is "the general vehicle" and not the particular type of vehicle (step S7: NO), and thus the process proceeds to the next step S8.

In step S8, the scene determination unit 78 determines whether the particular type of vehicle has been recognized ahead of the host vehicle 100. In the example of FIG. 5, another vehicle 130 on the second lane L2 is recognized short of or in front of the stop line 116 (step S8: YES), and therefore the process proceeds to step S9.

In step S9, the lane change determination unit 80 sets a timing to start the lane change control, to an "earlier" timing. More specifically, the lane change determination unit 80 sets the lane change distance Dc to D1 (Dc=D1 (>D2)) that is "longer than normal".

In a manner similar to the first driving scene (FIG. 4), after the host vehicle 100 reaches the execution start position 118 (step S5: YES), the lane change control is performed (step S6). After that, the travel controller 82 outputs the generated control signals to the driving force output device 40, the steering device 42, and the braking device 44. The notification controller 84 outputs the generated notification signal to the notification device 46.

As illustrated in FIG. 5, the host vehicle 100 starts to change the lane at the execution start position 118 and moves from the first lane L1 to the second lane L2 along an actual route P2 shown by a dash-dot line. Thereafter the host vehicle 100 turns left from a position across the stop line 116 and then passes through the intersection 128.

In this manner, in a case where the second lane L2 is a priority lane and a particular type of vehicle (another vehicle 130) exists ahead of the host vehicle 100, the vehicle controller 68 may start the lane change control (travel control or assistance control) earlier than in the case where the second lane L2 is not the priority lane.

Thus, in consideration of the possibility that another vehicle 130 ahead of the host vehicle 100 may interrupt the lane change of the host vehicle 100, the lane change can be performed smoothly and quickly.

Thus, in the second driving scene illustrated in FIG. 5, the vehicle control device 10 starts the lane change control at the execution start position 118 where the distance D from the stop line 116 is D1 (D=D1). Next, description is given of an operation of the vehicle control device 10 in another situation (third driving scene) that is different from the situations in FIGS. 4 and 5.

Figure 6:
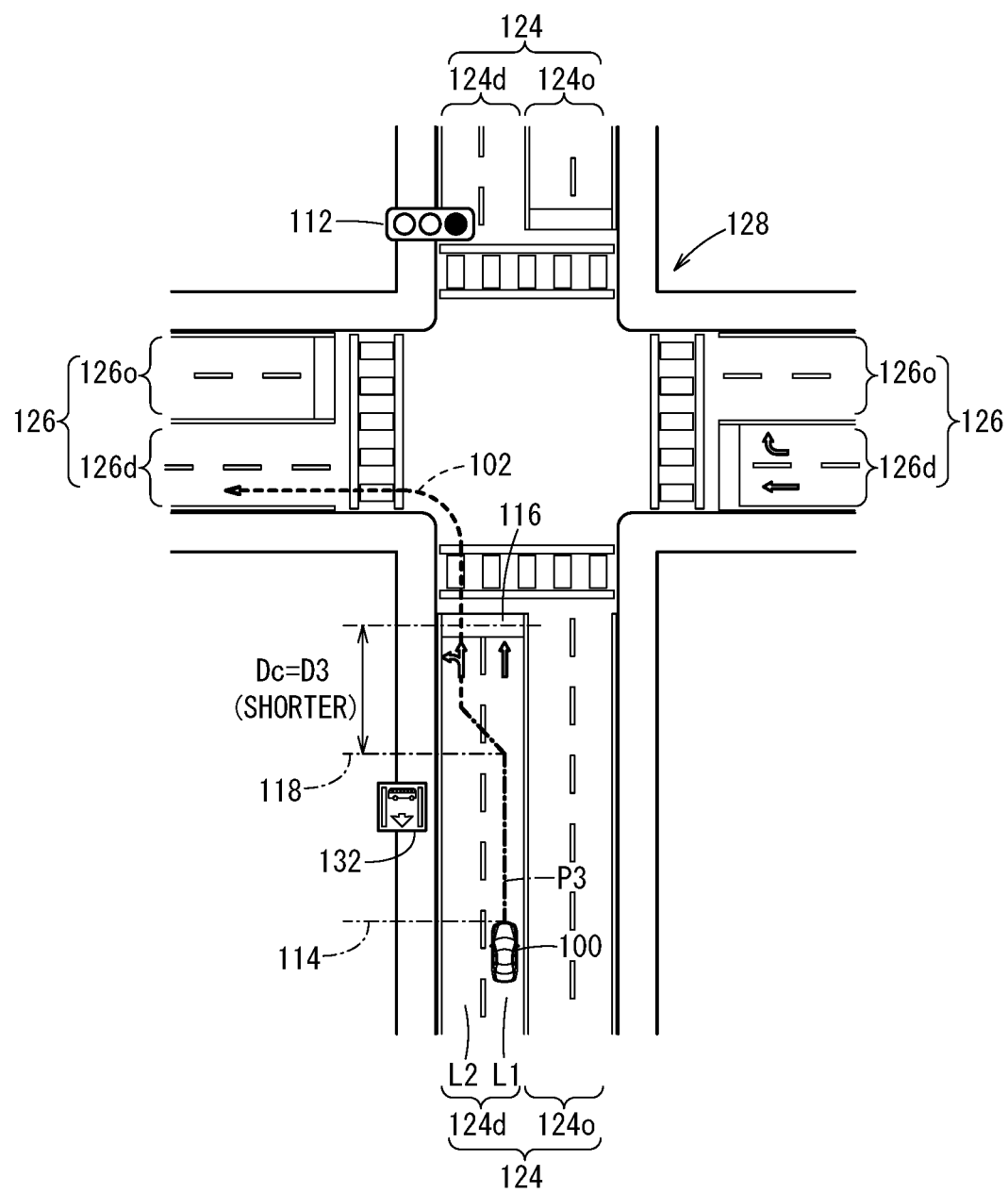
FIG. 6 illustrates a third driving scene around an intersection.

FIG. 6 illustrates the third driving scene around the intersection 128. The host vehicle 100 intends to pass the intersection 128 along the scheduled travel route 102 shown by a dashed arrow. Here, this driving scene is different from the driving scene in FIG. 5 in that another vehicle 130 does not exist ahead of the host vehicle 100. That is, the particular type of vehicle (another vehicle 130) is not recognized ahead of the host vehicle 100 (step S8: NO), and thus the process proceeds to step S10.

In step S10, the lane change determination unit 80 sets a timing to start the lane change control, to a "later" timing. More specifically, the lane change determination unit 80 sets the lane change distance Dc to D3 (Dc=D3 (<D2)) that is "shorter than normal". Note that the numeral values of D1 to D3 satisfy a relation of D1>D2>D3.

In a manner similar to the first driving scene (FIG. 4) and the second driving scene (FIG. 5), after the host vehicle 100 reaches the execution start position 118 (step S5: YES), the lane change control is performed (step S6). After that, the travel controller 82 outputs the generated control signals to the driving force output device 40, the steering device 42, and the braking device 44. The notification controller 84 outputs the generated notification signal to the notification device 46.

As illustrated in FIG. 6, the host vehicle 100 starts to change the lane at the execution start position 118 and moves from the first lane L1 to the second lane L2 along an actual route P3 shown with a dash-dot line. Thereafter, the host vehicle 100 turns left from a position across the stop line 116, and then passes the intersection 128.

In this manner, in the case where the second lane L2 is the priority lane and the particular type of vehicle (another vehicle 130) does not exist ahead of the host vehicle 100, the vehicle controller 68 may start the lane change control (travel control or assistance control) later than in the case where the second lane L2 is not the priority lane. As a result, an extra time is secured in order to allow the particular type of vehicle that may approach the host vehicle 100 from behind to preferentially travel, and therefore the possibility that the host vehicle 100 might interrupt traveling of the particular type of vehicle can be decreased.

[Effect of Vehicle Control Device 10]

As described above, the vehicle control device 10 is the device that performs the travel control for the host vehicle 100 at least partially automatically, and includes [1] the intersection recognition unit 72 configured to recognize the intersection 108, 128 on the scheduled travel route 102 of the host vehicle 100; and [2] the vehicle controller 68 configured to perform the travel control or the assistance control regarding the lane change when the host vehicle 100 turns right or left at the recognized intersection 108, 128. [3] In the case where the host vehicle 100 that is traveling on the first lane L1 intends to turn right or left via the second lane L2 whose traveling direction coincides with that of the first lane L1, the vehicle controller 68 is configured to perform the travel control or the assistance control that differs depending on whether the second lane L2 is the priority lane where the particular type of vehicle (another vehicle 130) different in type from the host vehicle 100 preferentially travels.

In this vehicle control method, one or a plurality of computers [1] recognizes the intersection 108, 128 on the scheduled travel route 102 of the host vehicle 100 (step S1), and [2] performs the travel control or the assistance control regarding the lane change when the host vehicle 100 turns right or left at the recognized intersection 108, 128 (step S6). [3] In the case where the host vehicle 100 that is traveling on the first lane L1 intends to turn right or left via the second lane L2 whose traveling direction coincides with that of the first lane L1, the travel control or the assistance control that differs depending on whether the second lane L2 is the priority lane where the particular type of vehicle (another vehicle 130) different in type from the host vehicle 100 preferentially travels is performed in step S6.

In this manner, the travel control or the assistance control that differs depending on whether the second lane L2 through which the host vehicle 100 passes when turning right or left is the priority lane where another vehicle 130 that is different in type from the host vehicle 100 preferentially travels is performed. Therefore, it is possible to perform the lane change in accordance with a driving scene in relation to another vehicle 130 that can exist around the intersection 108, 128. Thus, convenience for driving in a predetermined driving scene where the host vehicle 100 intends to turn right or left at the intersection 108, 128 can be enhanced.

The first lane L1 may be the lane where turning right or left at the intersections 108, 128 is not permitted and the second lane L2 may be the lane where turning right or left at the intersections 108, 128 is permitted. From the viewpoint of the traffic rules, the host vehicle 100 must pass the second lane L2, and therefore the travel control or the assistance control that differs depending on the second lane L2 is particularly effective.

[Supplement]

The present invention is not limited to the embodiment above, and can be changed freely without departing from the scope of the present invention. Alternatively, the structures may be combined arbitrarily within a range in which there is no technical inconsistency.

Although the above embodiment has described the example in which the particular type of vehicle is "the bus", the vehicle may be another type of vehicle (for example, a streetcar). In addition, "the priority lane" may be a lane dedicated to a particular type of vehicle, where a vehicle is temporarily permitted to enter if a predetermined condition is satisfied.

Although in the above embodiment, each of the roads 104, 124 on which the host vehicle 100 travels has two lanes on each side, the roads 104, 124 may have three or more lanes on each side. In such a road shape, the first lane L1 and the second lane L2 are not adjacent to each other, and the host vehicle 100 may turn right or left at the intersection via two or more lanes.

Although the lane change distance Dc is changed in three stages (D1 to D3) in the above embodiment, adjusting of the lane change control is not limited to the above way. For example, the lane change control may be adjusted by setting the steering speed variably.

The present invention is also applicable to a case in which a vehicle travels on the right side of the road.

What is claimed is:

1. A vehicle control device configured to perform a travel control for a host vehicle of a first category at least partially automatically, comprising:
   an intersection recognition unit configured to recognize an intersection on a scheduled travel route of the host vehicle; and
   a vehicle controller configured to perform the travel control or an assistance control regarding a lane change when the host vehicle turns right or left at the intersection recognized by the intersection recognition unit,
   wherein when the host vehicle intends to turn right or left at the intersection from a travel lane, on which the host vehicle is traveling, via an adjacent lane adjacent to the travel lane, in a case where the adjacent lane is a priority lane where a second vehicle of a second category different from the first category preferentially travels and the second vehicle exists ahead of the host vehicle, the vehicle controller is configured to start the travel control or the assistance control earlier than in a case where the adjacent lane is not the priority lane.

2. The vehicle control device according to claim 1, wherein in a case where the adjacent lane is the priority lane and the second vehicle does not exist ahead of the host vehicle, the vehicle controller is configured to start the travel control or the assistance control later than in a case where the adjacent lane is not the priority lane.

3. The vehicle control device according to claim 1, wherein:
   the travel lane is a lane where turning right or left at the intersection is not permitted; and
   the adjacent lane is a lane where turning right or left at the intersection is permitted.

* * * * *